United States Patent
Liu et al.

(10) Patent No.: US 10,417,338 B2
(45) Date of Patent: Sep. 17, 2019

(54) EXTERNAL RESOURCE IDENTIFICATION

(71) Applicant: Hewlett-Packard Development Company, L.P., Houston, TX (US)

(72) Inventors: Lei Liu, Palo Alto, CA (US); Georgia Koutrika, Palo Alto, CA (US); Jerry J Liu, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 211 days.

(21) Appl. No.: 15/508,460

(22) PCT Filed: Sep. 2, 2014

(86) PCT No.: PCT/US2014/053683
§ 371 (c)(1),
(2) Date: Mar. 2, 2017

(87) PCT Pub. No.: WO2016/036345
PCT Pub. Date: Mar. 10, 2016

(65) Prior Publication Data
US 2017/0270098 A1    Sep. 21, 2017

(51) Int. Cl.
*G06F 17/21* (2006.01)
*G06F 17/27* (2006.01)
(Continued)

(52) U.S. Cl.
CPC ........ *G06F 17/2785* (2013.01); *G06F 3/0481* (2013.01); *G06F 17/248* (2013.01); *G06F 17/278* (2013.01)

(58) Field of Classification Search
USPC ...................................................... 704/7–10
See application file for complete search history.

(56) References Cited

U.S. PATENT DOCUMENTS 6,272,490 B1    8/2001   Yamakita
7,739,215 B2    6/2010   Horvitz et al.
(Continued)

FOREIGN PATENT DOCUMENTS

KR    10-2010-0115533 A    10/2010

OTHER PUBLICATIONS

Christian, Gutl Klaus, et al, "Enhanced Automatic Question Creator—EAQC: Concept, Development and Evaluation of an Automatic Test Item Creation Tool to Foster Modern e-Education". 2011.

*Primary Examiner* — Leonard Saint Cyr
(74) *Attorney, Agent, or Firm* — HP Inc. Patent Department

(57) ABSTRACT

Systems and methods associated with external resource identification are disclosed. One example method may be embodied on a non-transitory computer-readable medium storing computer-executable instructions. The instructions, when executed by a computer may cause the computer to perform the method. The method includes classifying a segment of a document into a member of a set of topics discussed within the document. The method also includes identifying, based on the structure of the segment and keywords from the segment, information that a reader of the document could seek upon reading the segment. The method also includes obtaining, based on the member of the set of topics, a set of candidate external resources that potentially contain the information. The method also includes presenting, in response to a user interaction with the document, a member of the set of candidate external resources identified as being likely to contain the information.

13 Claims, 8 Drawing Sheets

(51) Int. Cl.
  *G06F 3/0481*  (2013.01)
  *G06F 17/24*  (2006.01)

(56) References Cited

U.S. PATENT DOCUMENTS

| | | |
|---|---|---|
| 8,370,278 B2 | 2/2013 | Vadlamani et al. |
| 8,560,567 B2 | 10/2013 | Azzam et al. |
| 8,601,030 B2 | 12/2013 | Bagchi et al. |
| 8,990,241 B2 * | 3/2015 | Wu .................... G06F 17/3064 707/752 |
| 2003/0079183 A1 | 4/2003 | Tada |
| 2005/0091203 A1 * | 4/2005 | Liu .................... G06F 17/30719 |
| 2010/0211595 A1 * | 8/2010 | Yamamoto ........ G06F 17/30699 707/769 |
| 2011/0047161 A1 * | 2/2011 | Myaeng ............ G06F 17/30672 707/740 |
| 2011/0125734 A1 | 5/2011 | Duboue et al. |
| 2011/0131216 A1 | 6/2011 | Chakravarthy |
| 2011/0276322 A1 | 11/2011 | Sandor |
| 2013/0085745 A1 * | 4/2013 | Koister ............... G06F 17/2785 704/9 |
| 2014/0317104 A1 * | 10/2014 | Isaacs ............... G06F 17/30554 707/728 |

* cited by examiner

EXTERNAL RESOURCE IDENTIFICATION

BACKGROUND

One attribute of students who excel at learning new information, is that they ask themselves questions about texts they are reading, and then seek out answers to these questions. Some of these questions may be easier to answer than others. For example, answers to literal questions (e.g., "who?", "what?", "where?", "when?") may be easier to uncover than answers to inferential questions (e.g., "why?", "how?") because inferential questions may require a more thorough understanding of the text. In some cases, the text the student is reading may not contain the answer to the student's self-generated question. In this case, the student may need to seek out an external resource containing the answer. A student may, for example, ask a teacher or parent, visit a library to research the topic of the text or access a reference identified in the text, search the internet for an answer, and so forth.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

Systems and methods associated with external resource identification are described. In various examples, external resources may be identified that provide answers to questions that readers may have as a result of reading a document. In various examples, topics covered by the document may be identified, at which point segments of the document may be classified according to their relationships to the various topics. Using keywords from the segments and structures of the segments, questions that a reader may have while reading the segments may be identified from the segments using various templating techniques. Based on these questions, and the topics with which the segments are related, a user interacting with a segment (e.g., using a user interface) may be presented with resources external to the document that have a high likelihood of containing information relating to a question the user may have as a result of reading the document.

It is appreciated that, in the following description, numerous specific details are set forth to provide a thorough understanding of the examples. However, it is appreciated that the examples may be practiced without limitation to these specific details. In other instances, well-known methods and structures may not be described in detail to avoid unnecessarily obscuring the description of the examples. Also, the examples may be used in combination with each other.

Figure 1:
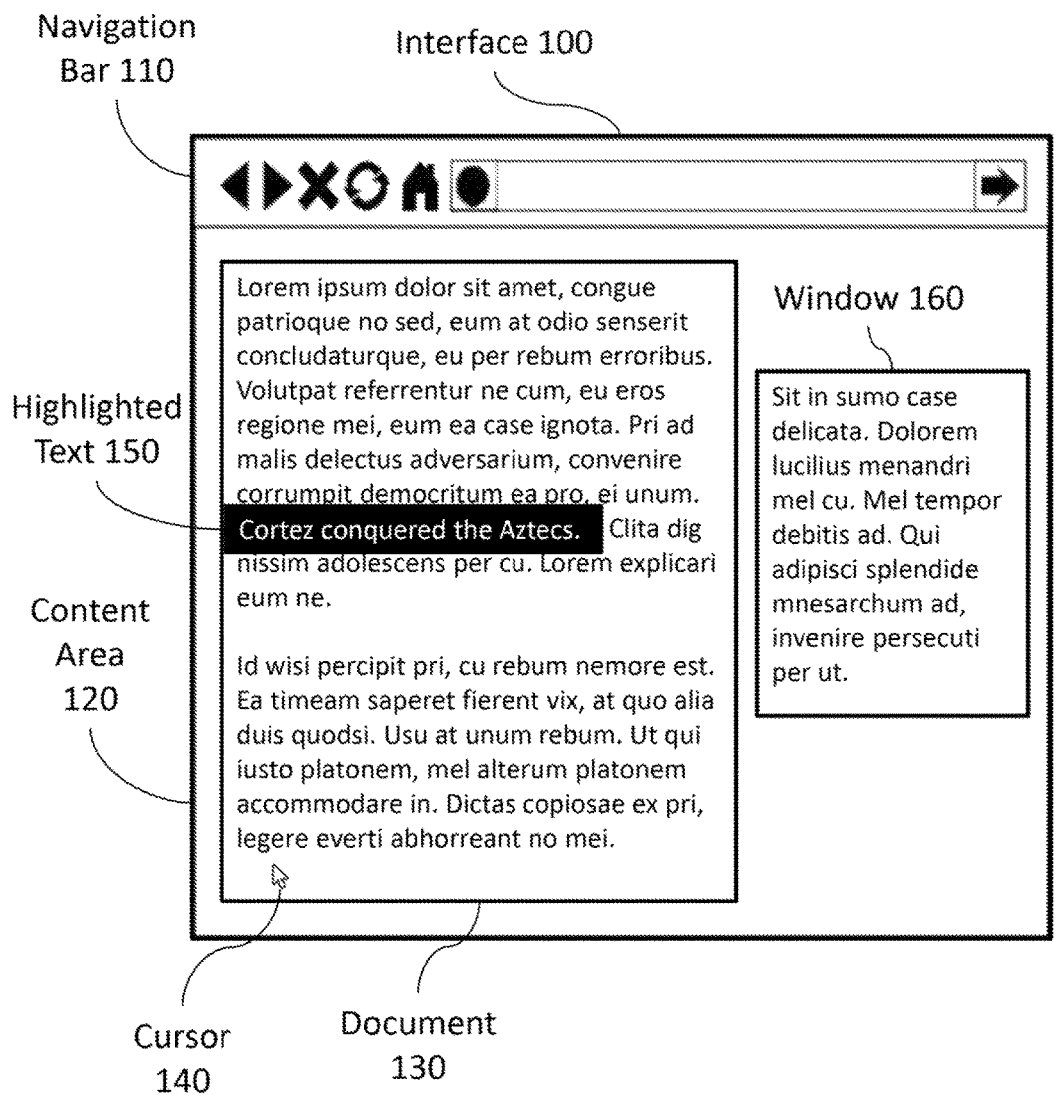
FIG. 1 illustrates an example interface that lay allow a user to interact with example systems and methods, and equivalents.

FIG. 1 illustrates an example interface 100 that may allow a user to interact with example systems and methods, and equivalents. It should be appreciated that interface 100 is an illustrative example and many different interfaces could be used. For example, interface 100 may be an appropriate interface for a system modeled based on a web browser on a computer. An interface designed to operate on a tablet or other mobile device may be organized according to design and/or user interaction practices associated with that device. Additionally, though some methods of interacting with interface 100 are described, other methods may also be appropriate.

Interface 100 includes a navigation bar 110. In this example, where interface 100 may be designed similar to a web browser, navigation bar 110 may include forward and back buttons, a home button, an address bar, a search bar, and so forth. In the example where an address bar is included, the address bar may indicate a document or a location of a document being viewed by a user.

Interface 100 also includes a content area 120. Content area 120 may include many sub areas displaying content such as document 130. Document 130 may be a text accessed by a user interacting with interface 100. Document 130 may also include content besides text including, for example, images, video, audio, and so forth.

The user may be able to interact with elements of interface 100. The user may use, for example, cursor 140 to interact with interface 100. Cursor 140 may be controlled by the user with a mouse or other similar device. Other peripherals (e.g., a keyboard) and technologies may also allow the user to interact with interface 100.

In this example, the user has interacted with document 130 using, cursor 140 by highlighting a portion of document 130 to create the highlighted text 150. In this example, a sentence has been highlighted. In response to highlighting the text, systems and methods disclosed herein may be able to analyze highlighted text 150 and identify information related to highlighted text 150 that the user is interested in learning more about. These systems and methods may then retrieve resources external to document 130, and identify which of the external resources are, likely to contain this information. The user may be referred to these references via components of interface 100. In some cases, it may be appropriate to pre-analyze document 130 to pre-identify the external resources and provide the references to the user in response to a user interaction.

Two different example approaches for referring a user to external information are shown in interface 100. In this example highlighted text 150 reads "Cortez conquered the Aztecs." Upon reading this sentence, a reader might have several questions including, for example, "Who was Cortez?" "When were the Aztecs conquered?" and "Why did Cortez conquer the Aztecs?" Once systems and methods described herein have identified these questions, encyclopedia articles may be identified that are likely to answer these questions.

In one example, an article itself provided to a user in window 160 upon the user interacting with document 130 to create the highlighted text 150. For example, window 160 may display an encyclopedia article regarding Cortez, the Aztec nation, and the Spanish colonization of America, and so forth, depending on what article is identified as being most relevant to highlighted text 150.

In an alternative example, the questions themselves may be provided to the user via window 160. Upon interacting with the questions themselves in window 160, the user may be taken to an article found that was identified as being most likely to provide an answer for that question. For example, interacting with the text reading "Who was Cortez?" in window 160 may take the user to the article regarding Cortez. In one example, this may cause the article to be displayed in content area 120, replacing document 130. In another example, window 160 may be placed with two windows, one displaying questions, and one displaying answering resources in response to a user interaction with one of the questions.

Identifying the answering resources that will be provided to a user via, for example, window 160 may begin by parsing document 130. Parsing document 130 may begin with several preprocessing steps to remove extraneous information from document 130. Preprocessing may include, for example, removing noisy words, removing stop words, stemming, and so forth. Once, preprocessing has been completed, an information retrieval technique to identify topics that document 130 discusses may be applied to document 130. Each of the topics may defined by a set of keywords that are associated with the topic. Keywords for a topic may be selected based on words from document 130 that frequently appear near one another when that topic is being discussed in document 130. Information retrieval techniques for generating the topics and their associated keywords may include, for example, probabilistic latent semantic indexing (PLSI), latent Dirichlet allocation (LDA), and so forth.

By way of illustration, after preprocessing has been performed on document 130, a portion-word matrix W may be generated. The portion-word matrix W may be processed according to an appropriate information retrieval technique, outputting a portion-topic matrix T, where each topic is represented by a set of words. A value $T_{ij}$ in the portion-topic matrix may represent a likelihood that the i'th portion of document 130 covers the j'th topic identified. By way of illustration, a portion X of document 130 with topic scores of $T_{X1}$=0.5, $T_{X2}$=0.5, and $T_{X3}$=0 would indicate that portion X has 50% probabilities of being associated with topics 1 and 2, and no likelihood of being associated with topic 3. These probabilities may be identified based on the keywords found in portion X and the keywords associated with each of the topics.

Because numerous topics may be identified from any given document 130, it may be worthwhile to compress the number of topics to a limited number prior to associating individual segments of document 130 with the topics, or searching for external resources. Compressing the number of topics may, for example, ensure that external resources found are more likely to be related to document 130, and may also enhance processing efficiency.

In some instances, topics covering similar information may be identified, and these similar topics may be condensed into a single topic or a small number of topics. Topics covering similar information may be identified using, for example, Spearman's correlation, Pearson correlation, Cosine similarity, and so forth. These techniques may rely on word distribution of topics to identify when topics are related. Additionally, pruning uncommon topics may further reduce the size of the set of topics provided as a part of initial processing of document 130. Identifying the uncommon topics may involve, for example, examining the probabilities associated with the topics in the portion-topic matrix and removing topics whose combined probabilities to not exceed a certain threshold.

Once the set of topics has been generated, including the words with which the topics are associated, document 130 may be parsed into small segments and a topic with which each segment is associated with may be identified. Note that these segments may be different than the portions of document 130 used to generate the topics described above. Parsing document 130 into segments may include extracting "elementary sentences" from document 130. For cases where document 130 contains complex grammatical structure, computational linguistic analysis may be necessary (e.g., a Charniak parser). If document 130 is less complex, it may be appropriate to generate the "elementary sentences" based on the punctuation of document 130.

Once the segments of document 130 have been identified, each segment may be assigned to one of the topics generated above. In one example, a supervised approach may be applied to classify the segments into the topics. A supervised approach typically relies on a domain expert to classify a subset of segments of a document into the topics, and then using a statistical classifier model (e.g., support vector machine, decision tree, random forest) to classify remaining sentences.

In an alternative example, clustering techniques may be useful for categorizing segments. Clustering techniques may be especially appropriate because the number of clusters will be known in advance based on the number of topics generated. Some clustering techniques include, for example, K-means, modularity based clustering, spectral clustering, and so forth.

In a third example, because each topic is associated with a set of keywords, each segment may be classified based on the keywords from the segment. Where segments contain keywords associated with multiple topics, the keywords may be provided a "vote" based on their importance to the segment and their importance to the topic.

By way of illustration, consider a topic-term matrix. A, where $A_{iq}$ indicates the importance (e.g., weight) of the q'th term to the i'th topic, and segment-term matrix B, where $B_{pq}$ represents the importance (e.g., weight) of the q'th term to the p'th sentence. For segments of different lengths, weight values of terms may be normalized to a standardized length to ensure some terms are not given too much weight for any given sentence. Segment-topic matrix S may then be generated from matrixes A and B according to equation 1, such that $S_{pi}$, represents the likelihood that segment p belongs to the i'th topic.

$$S = BA^T \text{ where } S_{pi} = \Sigma_q B_{pq} A_{qi} \qquad 1.$$

Consequently, from matrix S, the topic for sentence p can be assigned to topic k by choosing the largest entry i in the row of matrix S with which sentence p is associated (e.g., according to equation 2).

$$k = \text{ArgMax}_i(S_{pi}) \qquad 2.$$

Once segments are assigned to topics, questions may be generated from the segments. Generating questions from the segments may be valuable because if external resources are initially gathered based on a search query, a search query based on a question may provide different results than a search query based on a segment from which the question was generated. By way of illustration, consider the segment "people could use big data with a supervised approach to predict the future." Running this segment through a search engine may provide different results from running the question, "How can big data predict the future?" through the search engine.

Consequently, questions may be generated from the segments to attempt to identify information that a reader of document 130 may seek while reading document 130. First, keywords from the segment may be classified into "named entities." Named entities are words or phrases in a document that fall into predefined categories such as people, locations, organizations, geo-political entities, facilities, dates, money, percentages, and so forth. Note that not all keywords from the segment may be named entities, and that the keywords identified as named entities may be different than the keywords used above for the purposes of identifying topics associated with document 130, and classifying the segments in the topics. Extracting named entities may facilitate associating the segment with various types of questions. For example, identifying a person may associate the segment with a "who" questions, and identifying a date may associate the segment with "when" questions.

Once keywords have been categorized into named entities, linguistic patterns surrounding the keywords may be identified. The linguistic patterns may be known syntactical phrases that may surround the named entities or other keywords. Example linguistic patterns may include, for example, statement constructions, if constructions (e.g., " . . . if . . . "), temporal expressions, auxiliary verbs (e.g., do, has, may), and so forth.

From the linguistic patterns and their respective named entities, questions may be generated. Generating the questions may involve applying templates to the linguistic patterns and named entities. For example, a statement expression may be associated with a question formatted, "What/why/how did . . . ?" An "if construction" may be associated with a question formatted, "What would happen if . . . ?" A temporal expression may be associated with a question formatted, "When would . . . happen?" An auxiliary verb may be associated with a question formatted "Why <auxiliary verb> . . . ?"

To illustrate, highlighted text 150 ("Cortez conquered the Aztecs") may be identified as a statement expression, from which the question "How did Cortez conquer the Aztecs?" may be generated. Other types of templates for linguistic patterns and named entities may also be generated and may result in different types of questions. For certain types of named entities, linguistic patterns may be unnecessary for generating an appropriate question. For example, the name "Cortez" from highlighted text 150 may cause the question "Who was Cortez?" to be generated without examining the sentence structure of highlighted text 150.

Using the questions, candidate external resources may be obtained. In one example, candidate external resources may be obtained by inputting the questions into a search engine and using the results as the candidate external resources. In another example, a database may be queried based on the questions. The database may be, for example, a pre-crawled portion of a website, an encyclopedia, and so forth.

The candidate external resources may be text documents or other types of resources that can be modeled as a collection of words. For example, a video may be an appropriate candidate resource if text can be extracted from the video via, for example, a transcript, a speech to text function, and so forth.

After obtaining the candidate external resources, a re-ranking of the candidate external resources may be appropriate. Re-ranking the candidate external resources may begin by identifying keywords from each of the candidate external resources, and based on the keywords, identifying topics with which the candidate external resources are related. These techniques may be similar to those described above when extracting keywords and topics from document 130.

Additionally, the candidate external resources may need to be divided into segments similar to the way the original document was divided. Though candidate external resources may cover a specific topic, some candidate external resources may cover multiple topics and therefore may benefit from being broken up into multiple portions which can be treated as separate documents for provision to a user.

Based on the topics with which the segment is related, and the topics with which the candidate external resources are related, a distance function or a similarity function may be used to compare the relevance of the candidate external resources to the question. The function may be related to, for example, cosine similarity, Euclidean distance, RBF kernel, and so forth. Explicit references between document 130 and the candidate external resources may also be taken to consideration (e.g., hyperlinks, references in a bibliography, citations). Other methods of showing that the candidate external resources and the question are related may also be used. For example, if document 130 is targeted at readers who have completed third grade, candidate external resources having a similar reading level or other attributes may be prioritized.

By way of illustration, when identifying topics with which the segment was related, matrix W was created (above) that includes information that identifies how related the segment is to several topics. A process similar to the creation of matrix W may be applied to the candidate external resources to identify the topics with which the candidate external resources are related, generating a vector for each candidate external resource. The row in matrix W with which the segment, and hence the question, are related to may then be compared to the vectors for the candidate external resources. Based on these comparisons, the candidate external resources may be ranked so that the highest ranked candidate external resources may be provided to the user when the user takes an appropriate action (e.g., interacting with document 130 using cursor 140 to create highlighted text 150).

As mentioned above, there may be many methods of presenting the candidate external resources that are most related to the segment selected by the user (e.g., window 160). Further, depending on attributes of the user (e.g., their level of education), it may be appropriate to limit or increase the number of resources presented to the user to increase the likelihood the user finds an answer to any questions they may have.

Figure 2:
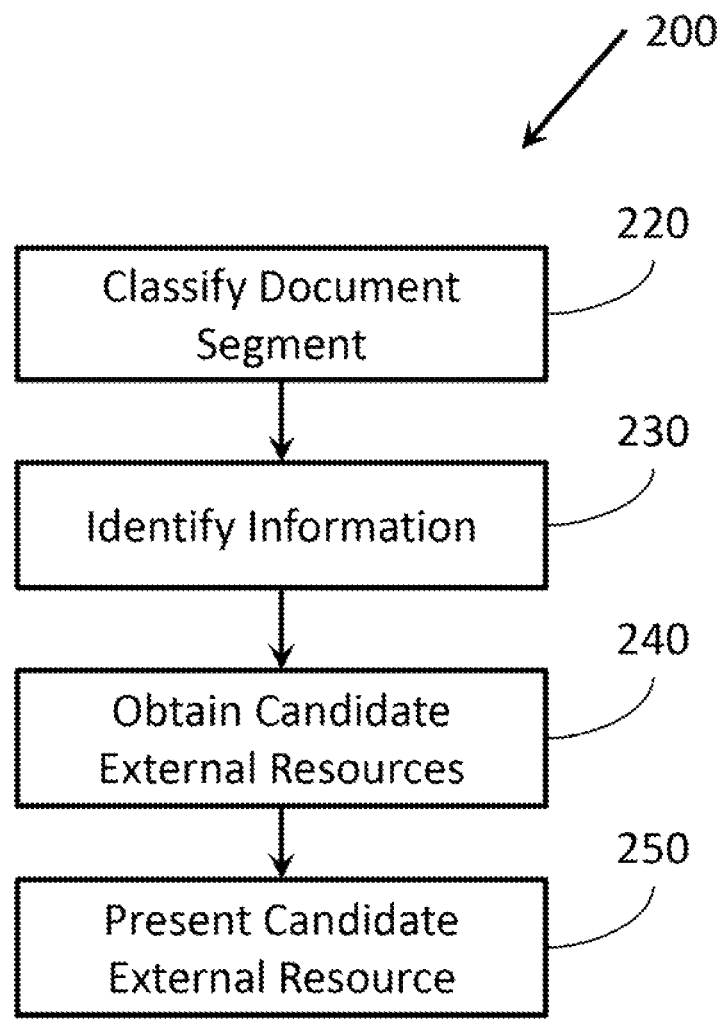
FIG. 2 illustrates a flowchart of example operations associated with external resource identification.

FIG. 2 illustrates a method 200 associated with external resource identification. Method 200 may be embodied on a non-transitory computer-readable medium storing computer-executable instructions. The instructions, when executed by a computer may cause the computer to perform method 200. Method 200 includes classifying a segment of a document at 220. The segment may be classified into a member of a set of topics discussed within the document. The topics may each be defined by a set of keywords, and the segments may be classified according to keywords within the segments and keywords associated with the topics.

Method 200 also includes identifying information that a reader of the document could seek upon reading the segment at 230. The information the reader could seek may be identified based on structure of the segment and keywords from the segment. The information the reader could seek may be essentially formatted in the form of questions that a reader might ask. Generating these questions may involve identifying keywords and segment structures, and then applying a template to the keywords based on the segment structure.

Method 200 also includes obtaining a set of candidate external resources, at 240. The set of candidate external resources may be obtained based on the member of the set of topics into which the segment was classified at action 220. The set of candidate external resources may be resources that potentially contain the information the reader of the document could seek identified at action 240. In various examples, the set of candidate external resources may be obtained from, for example, a search engine, a database of candidate resources, and so forth.

Method 200 also includes presenting a member of the set of candidate external resources at 250. The member of the set of candidate external resources may be presented based on a determination that the member of the set of candidate external resources is likely to contain the information identified at action 230. This may be determined by, for example, identifying topics discussed in the external resource and comparing the topics to topics associated with the information identified at action 230. The member of the set of candidate external resources may be presented in response to a user interaction with the document. In one example, the member of the set of candidate external resources may be presented to the user. By way of illustration, if the user interacts with a sentence in a document via a user interface, the user may be presented with references to a candidate external resource in the interface that, if interacted with by the user, may take the user to that candidate external resource.

Figure 3:
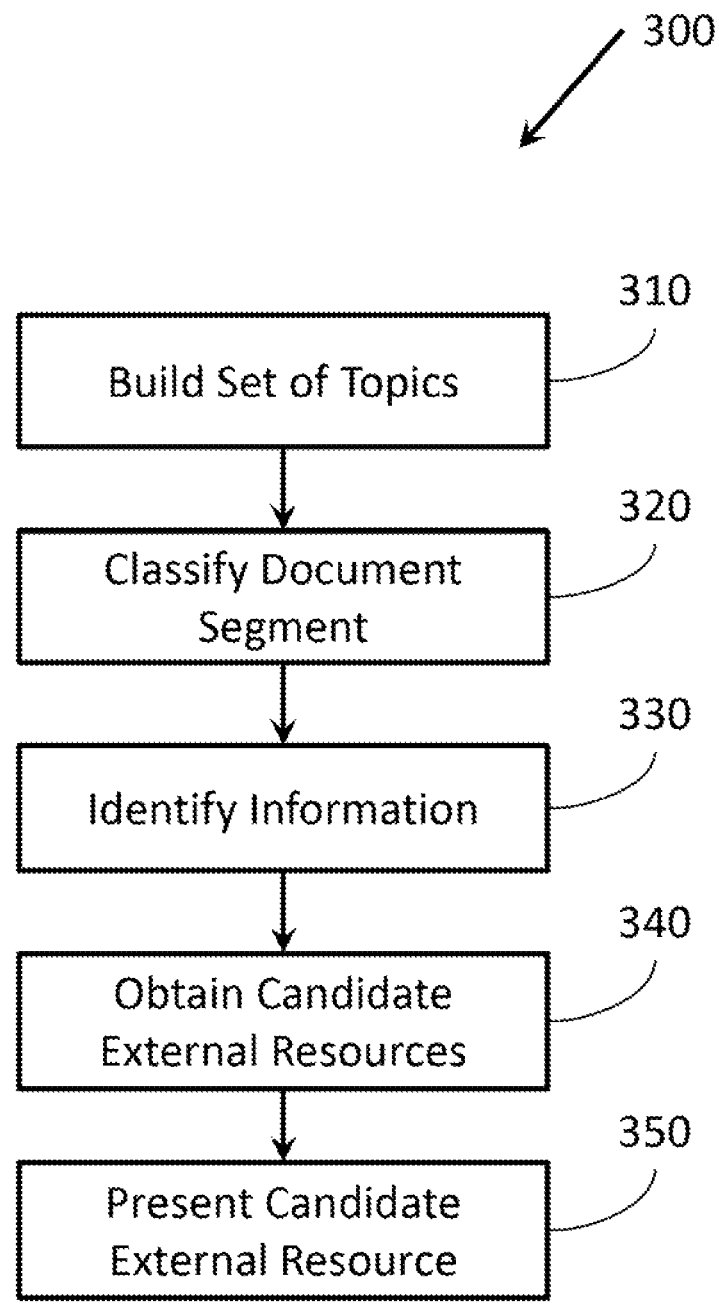
FIG. 3 illustrates another flowchart of example operations associated with external resource identification.

FIG. 3 illustrates a method 300 associated with external resource identification. Method 300 includes several actions similar to those described above with reference to method 200 (FIG. 2). For example, method 300 includes classifying a document segment into a set of topics at 320, identifying information at 330, obtaining candidate external resources at 340, and presenting candidate external resources at 350.

Method 300 also includes building the set of topics discussed within the document at 310. The set of topics may be built from the document. Building the set of topics from the document may include identifying topics within the document and associating the topics with keywords that will be used to define the topics. Associating the topics with the keywords may facilitate, for example, classifying document segments according to keywords within the segments. Thus, the document segment classified at action 320 may be classified into a topic from the set of topics built at action 310. The topics may be built at 310 using, for example, probabilistic latent semantic indexing, latent Dirichlet allocation, and so forth.

Figure 4:
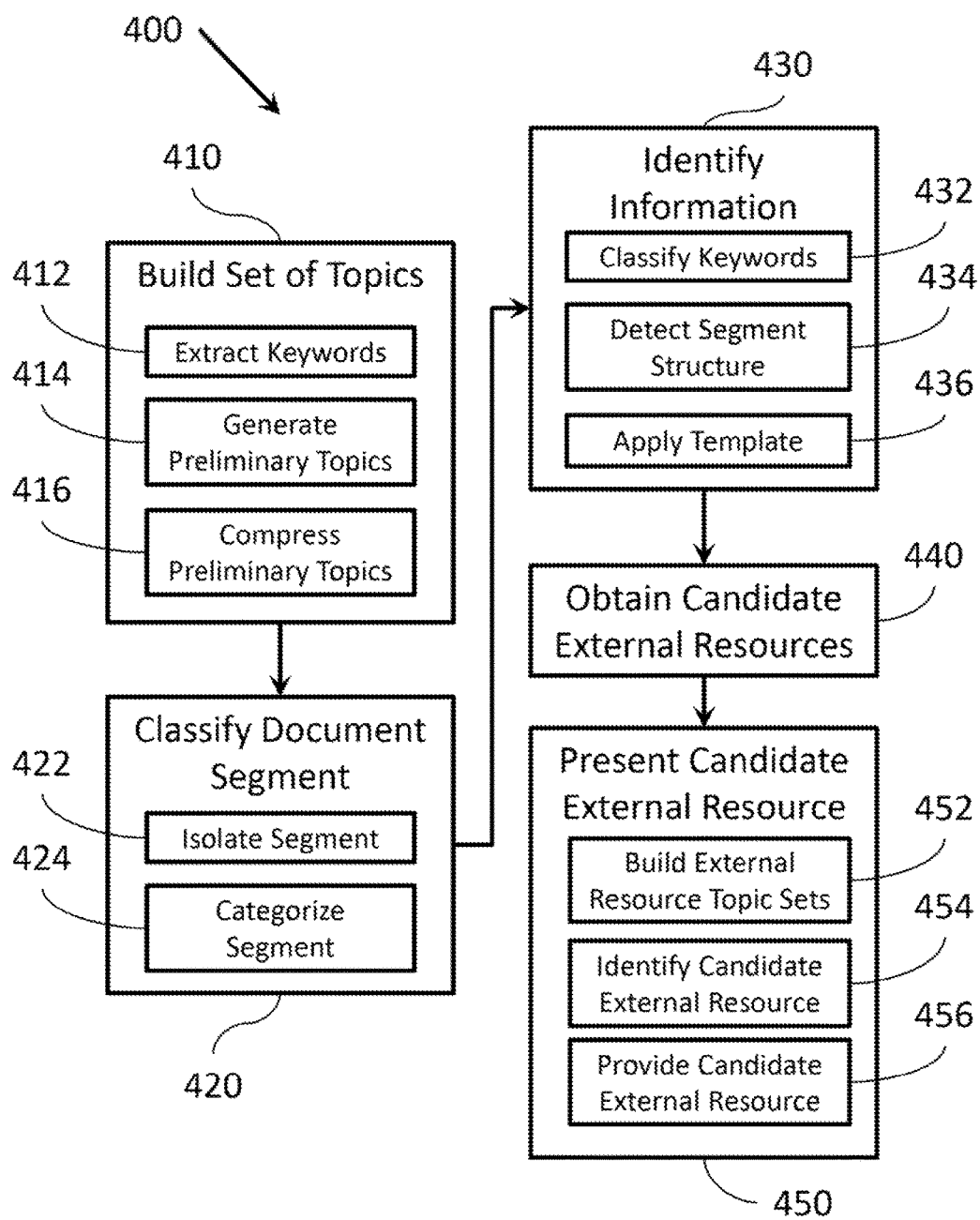
FIG. 4 illustrates an example system associated with external resource identification.

FIG. 4 illustrates a method 400 associated with external resource identification. In one example, method 400 may include more details into actions being performed by method 300 (FIG. 3). For example, method 400 includes building a set of topics from a document at 410, classifying a document segment at 420, identifying information that a reader of the document could seek based on segment structure and segment keywords at 430, obtaining a set of candidate external resources at 440, and presenting a candidate external resource at 450.

As a part of building the set of topics at 410, method 400 includes extracting keywords from the document at 412. Extracting the keywords may essentially be a set of preprocessing tasks to remove extraneous words (e.g., stop word filtering, stemming). Building the set of topics at 410 also includes generating a preliminary set of topics at 414. The preliminary set of topics may be generated based on keywords that commonly appear together. The preliminary set of topics may be generated in an unbound manner to attempt to fully identify topics discussed in the document. Consequently, building the set of topics at 410 also includes compressing the preliminary set of topics into the set of topics at 416. Compressing the preliminary set of topics may involve merging similar topics and pruning uncommon topics from the preliminary set of topics.

As a part of classifying the segment of the document at 420, method 400 includes isolating the segment within the document at 422. Isolating the segment may be based primarily on punctuation. For more complex documents, breaking the document down into an elementary sentence may involve other techniques (e.g., using a Charniak parser). Classifying the segment at 420 may also include categorizing the segment into the member of the set of topics at 424. The categorization may be based on keywords from the segment and keywords associated with the member of the set of topics. This may be performed by comparing a vector generated from the segment, and comparing it to vectors associated with the various topics using a distance function. The segment may then be categorized into the topic whose vector is "nearest" the vector generated from the segment.

As a part of identifying information that could be sought by a reader of the document at 430, method 400 includes classifying the keywords from the segment into named entities at 432. As mentioned above, named entities are words or phrases that fall into predefined categories. The categories may include, for example, people, locations, organization, dates, percentages, and so forth. Identifying information at 430 also includes detecting the structure of the segment surrounding the keywords at 434. The structures surrounding the keywords may take the form of, for example, statement expressions, if constructions, temporal expressions, auxiliary verbs, and so forth. Identifying information at 430 also includes applying a template to the structure of the segment and the keywords to identify the information at 436, For example, a statement expression detected around the keyword "Cortez" may result in the question "Who was Cortez?" being generated.

As a part of presenting member of the set of candidate external resources at 450, method 400 includes building external resource topic sets at 452. The external resource topic sets may describe topics with which respective members of the set of candidate external resources are related. The external resource topic sets may effectively be vectors that describe what topics the external resources are related to. Presenting the member of the set of candidate external resources at 450 also includes identifying the member of the set of candidate external resources at 454. The member of the set of candidate external resources may be identified based on its respective external resource topic set, and a set of topics associated with the segment. Thus, in the example, where the external resource topic sets are vectors, these vectors may be compared to a vector associated with the segment, and vectors of external resources "near" the vector of the segment may be selected for presentation. Presenting the member of the set of candidate external resources at 450 also includes providing the member of the candidate external resources to the user at 456. The member of the set of candidate external resources may be presented, for example, via a user interface as described above.

Figure 5:
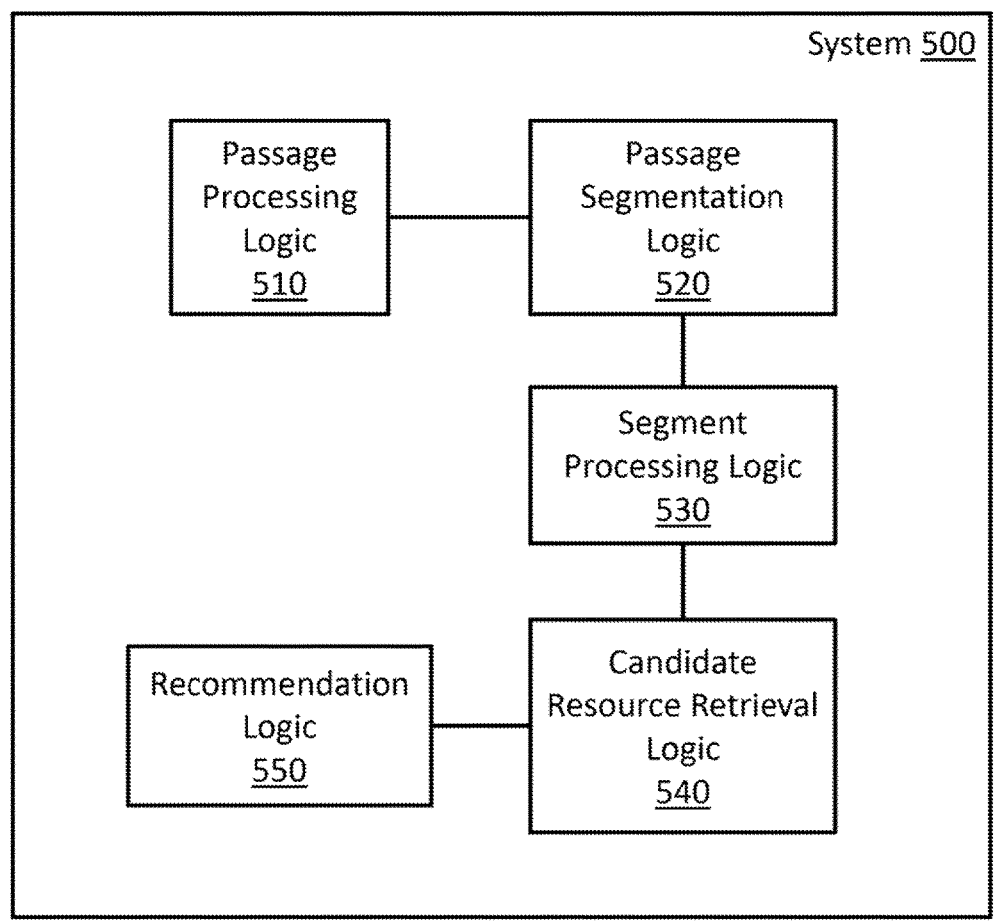
FIG. 5 illustrates another example system associated with external resource identification.

FIG. 5 illustrates a system 500 associated with external resource identification. System 500 includes a passage processing logic 510. Passage processing logic 510 may identify topics with which a passage is related. Passage processing logic 510 may also associate each of the topics with a set of keywords. Passage processing logic 510 may identify the topics and their keywords using, for example, probabilistic latent semantic indexing, latent Dirichlet allocation, and so forth.

System 500 also includes a passage segmentation logic 520. Passage segmentation logic 520 may classify segments of the passage into the topics identified by passage processing logic 510. The segments of the passage may be classified based on keywords within the segments. In one example, passage segmentation logic may classify the segments by generating vectors for the topics based on keywords associated with the topics and for the segments based on keywords in the segments. A distance function may be applied between the vectors for the segments and the vectors for the keywords to classify the segments.

System 500 also includes a segment processing logic 530. Segment processing logic 530 may generate a question from a segment. The question may be generated based on keywords within the segment and on linguistic patterns within the segment. In one example, segment processing logic 530 may apply a set of templates to the keywords within the segment and to the linguistic patterns within the segment to generate the question.

System 500 also includes a candidate resource retrieval logic 540. Candidate resource retrieval logic 540 may retrieve candidate external resources associated with the question. The candidate external resources may be retrieved from, for example, a database, a search engine, and so forth.

System 500 also includes a recommendation logic 550. Recommendation logic 550 may provide a candidate external resource to a user. Recommendation logic 550 may provide the candidate external resource to the user in response to the user interacting with the passage via an interface. The user may interact with the passage by, for example, selecting the segment from the interface, selecting the question from the interface, and so forth. The candidate external resource may be selected based on a topic with which the question is associated. In one example, vectors may be generated from the candidate external resources based on topics discussed by the candidate external resources. These vectors may then be compared to a vector associated with the segment using a distance function. The candidate external resource provided to the user may be associated with the vector "nearest" to the vector associated with the segment.

In one example, system 500 may operate as a service in a network such that recommendation logic 550 receives and responds to queries associated with a document on which other logics of system 500 operate. In other examples, system 500 may be a standalone system that operates on a computer that is being operated by the user.

Figure 6:
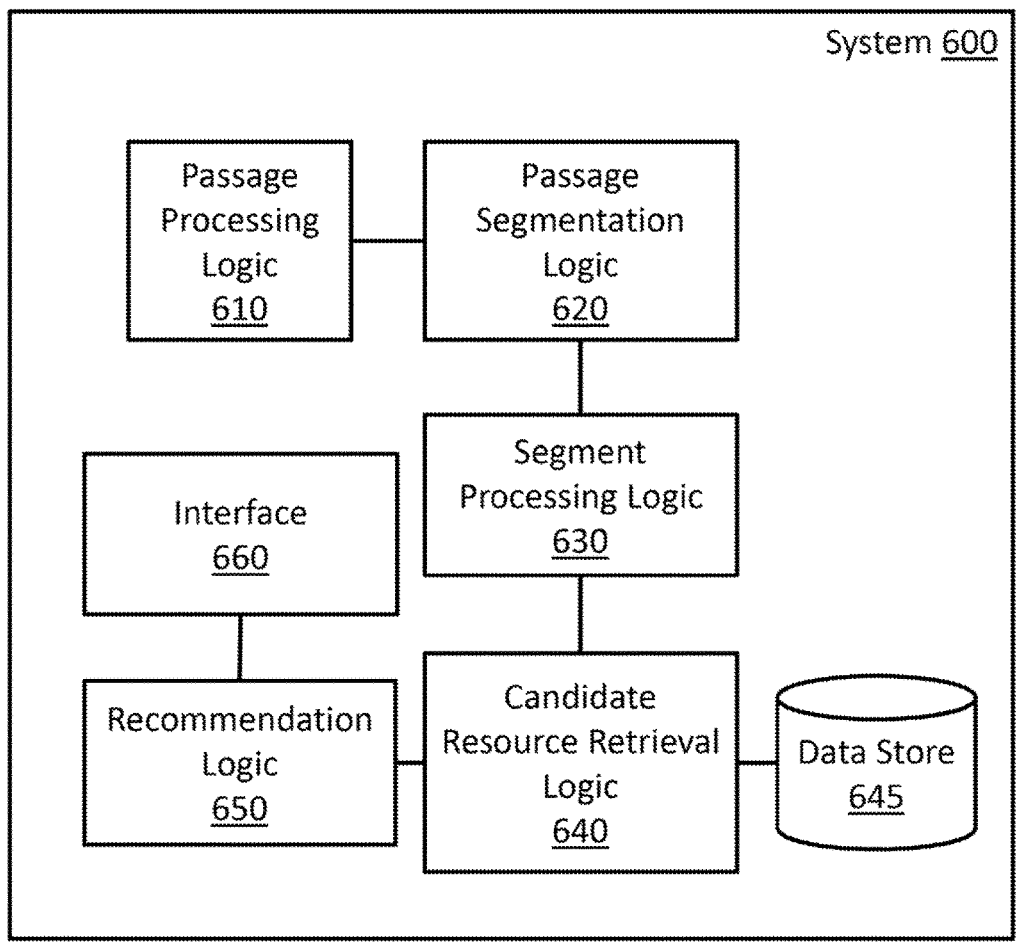
FIG. 6 illustrates another flowchart of example operations associated with external resource identification.

FIG. 6 illustrates a system 600 associated with external resource identification. System 600 includes many items similar to those described above with reference to system 500 (FIG. 5). For example, system 600 includes a passage processing logic 610, a passage segmentation logic 620, a segment processing logic 630, a candidate resource retrieval logic 640, and a recommendation logic 650.

System 600 also includes a data store 645. Data store 645 may store a set of resources. In this example, candidate external resource retrieval logic 640 may retrieve candidate external resources from data store 645. In this example, data store 645 may contain a set of preprocessed candidate external resources that system 600 has available to provide to the user. The data store may contain, for example, an encyclopedia, a repository of articles, technical information, and so forth.

System 600 also includes an interface 660. Interface 660 may be an interface with which a user may interact with a passage operated on by system 600. Consequently, the recommendation logic 650 may provide the candidate external resource to the user via the interface.

Figure 7:
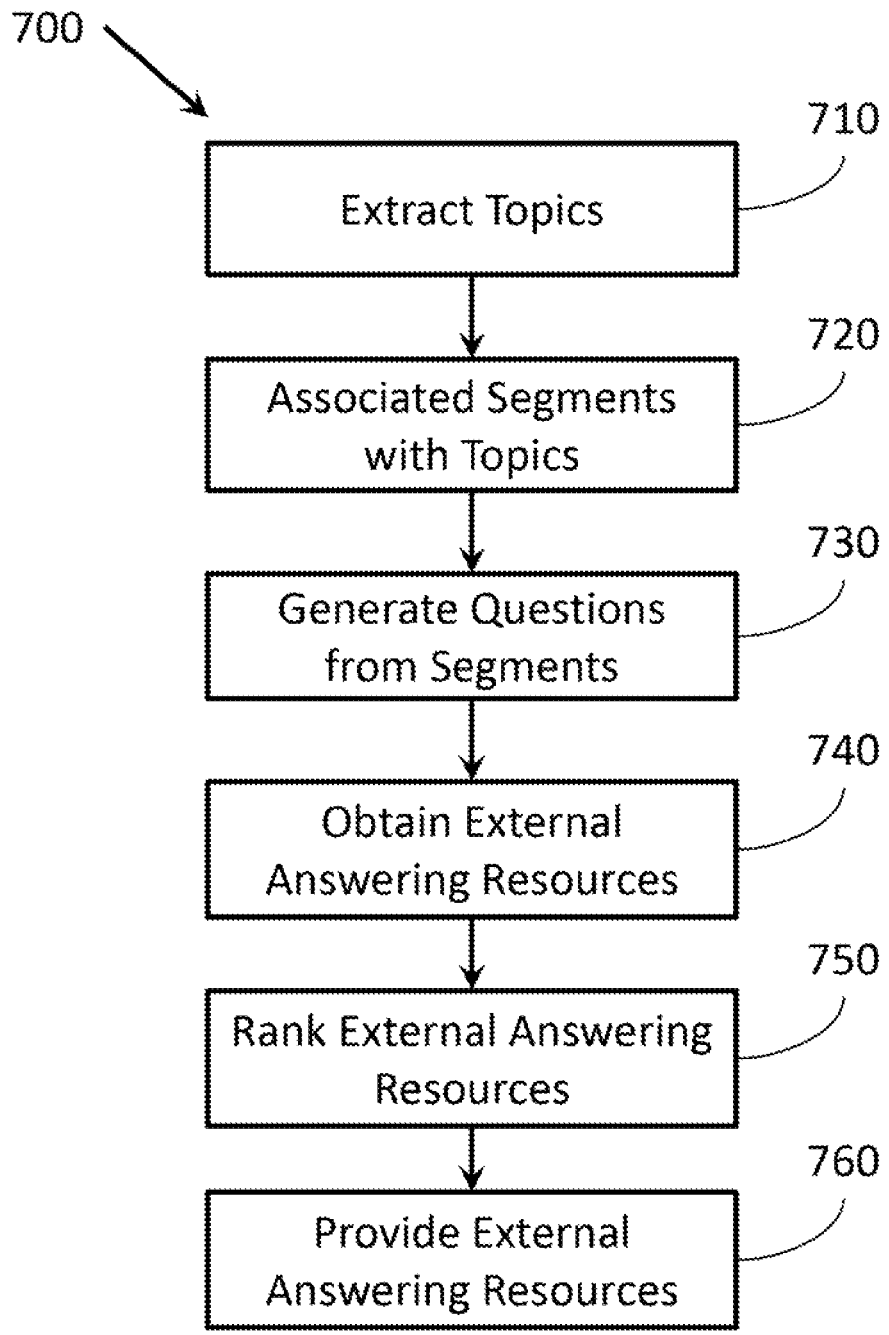
FIG. 7 illustrates another flowchart of example operations associated with external resource identification.

FIG. 7 illustrates a method 700 associated with external resource identification. Method 700 includes extracting topics discussed in a document from the document at 710. The topics may be defined by words associated with the respective topics within the document.

Method 700 also includes associating segments from the document with topics at 720. The segments may be associated with the topics based on words in the segments and based on the words associated with the respective topics. In one example, associating the segments with the topics may include converting the segments into segment vectors, converting the topics into topic vectors, and associating segments with topics based on distances between segment vector a topic vectors.

Method 700 also includes generating questions from the segments at 730. The segments may be generated by matching segment structures to linguistic patterns associated with question templates. Keywords and/or named entities identified in the segment may also be taken into consideration when generating the questions from the segments at 730.

Method 700 also includes obtaining a set of external answering resources at 740. The external answering resources may be obtained from, for example, a database, a search engine, and so forth. Method 700 also includes ranking members of the set of external answering resources at 750. The members of the set of external answering resources may be ranked to reflect a likelihood they contain information relating to the questions generated at action 730. Consequently, the members of the set of external answering resources may be ranked according to topics identified in the respective members of the set of external answering resources and on topics to which the questions are related.

In on example, ranking the members of the set of external answering resources may include converting the members of the set of external answering resources to resource vectors, and converting the questions to question vectors based on the segments with which the questions are related to. The members of the set of answering resources may then be ranked for the questions based on distances between the resource vectors and the question vectors.

Method 700 also includes providing members of the set of external answering resources at 760. The members of the set of external answering resources may be provided to a user. The members of the set of external answering resources may be provided in response to the user interacting with a question. The members of the set of external answering resources provided may be based on the rankings of the external answering resources for the question.

Figure 8:
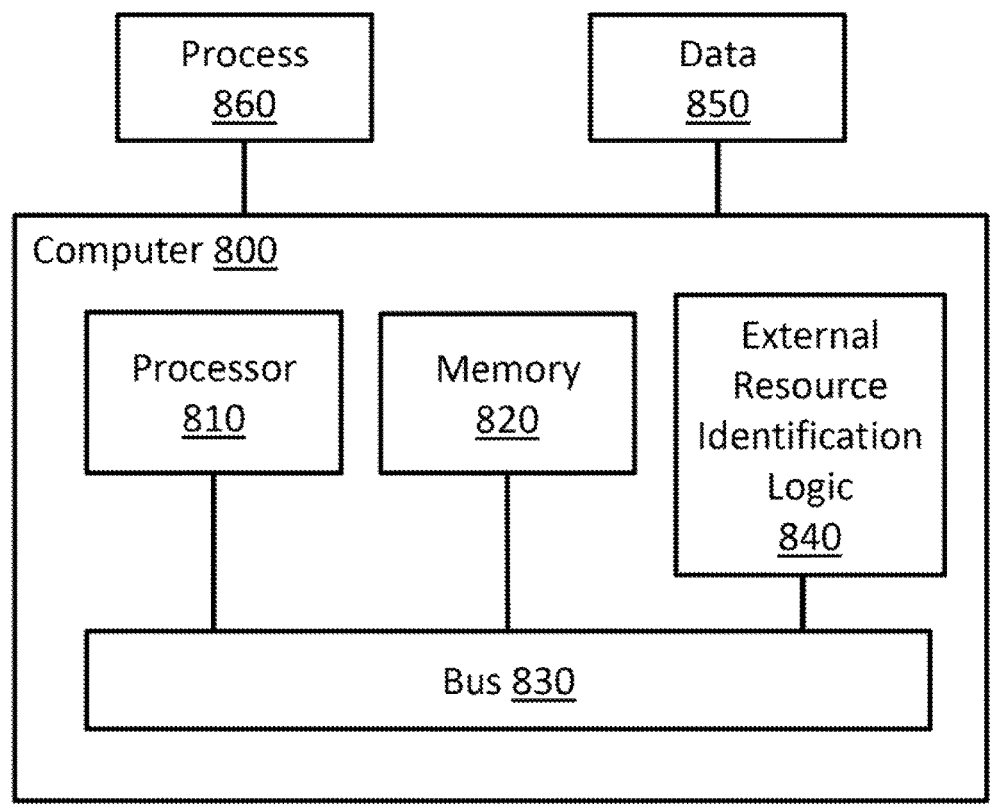
FIG. 8 illustrates an example computing device in which example systems and methods, and equivalents, may operate.

FIG. 8 illustrates an example computing device in which example systems and methods, and equivalents, may operate. The example computing device may be a computer 800 that includes a processor 810 and a memory 820 connected by a bus 830. The computer 800 includes an external resource identification logic 840. In different examples, external resource identification logic 840 may be implemented as a non-transitory computer-readable medium storing computer-executable instructions in hardware, software, firmware, an application specific integrated circuit, and/or combinations thereof.

The instructions may also be presented to computer 800 as data 850 and/or process 860 that are temporarily stored in memory 820 and then executed by processor 810. The processor 810 may be a variety of various processors including dual microprocessor and other multi-processor architectures. Memory 820 may include volatile memory (e.g., read only memory) and/or non-volatile memory (e.g., random access memory). Memory 820 may also be, for example, a magnetic disk drive, a solid state disk drive, a floppy disk drive, a tape drive, a flash memory card, an optical disk, and so on. Thus, Memory 820 may store process 860 and/or data 850. Computer 800 may also be associated with other devices including other computers, peripherals, and so forth in numerous configurations (not shown).

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A non-transitory computer-readable medium storing computer-executable instructions that when executed by a computer cause the computer to:
   classify a segment of a document into a member of a set of topics discussed within the document;
   identify, based on structure of the segment and keywords from the segment, information that a reader of the document could seek upon reading the segment;
   obtain, based on the member of the set of topics, a set of candidate external resources that potentially contain the information;
   receive a selection of the segment of the document in a first window of the user interface, wherein the first window comprises a content area;
   select a question associated with the segment of the document that is selected in the content area, wherein the question is selected from a second window of the user interface; and
   present in the second window a member of the set of candidate external resources identified as being likely to contain the information.

2. The non-transitory computer-readable medium of claim 1, where the instructions further cause the computer to:
   build, from the document, the set of topics discussed within the document.

3. The non-transitory computer-readable medium of claim 2, where the instructions for building the set of topics cause the computer to:
   extract keywords from the document;
   generate a preliminary set of topics based on keywords that commonly appear together; and
   compressing the preliminary set of topics into the set of topics by merging similar topics and pruning uncommon topics.

4. The non-transitory computer-readable medium of claim 1, where instructions for classifying the segment cause the computer to:
   isolate the segment within the document;
   categorize the segment into the member of the set of topics based on the keywords from the segment and keywords associated with the member of the set of topics.

5. The non-transitory computer-readable medium of claim 1, where instructions for identifying information cause the computer to:
   classify the keywords from the segment into named entities;
   detect the structure of the segment surrounding the keywords; and
   apply a template to the structure of the segment and the keywords to identify the information.

6. The non-transitory computer-readable medium of claim 1, where the set of candidate external resources are obtained from one or more of a search engine and a database of candidate resources.

7. The non-transitory computer-readable medium of claim 1, where instructions for presenting the member of the set of candidate resources cause the computer to:
   build external resource topic sets describing topics with which members of the set of candidate external resources are related;
   identify the member of the set of candidate external resources based on its respective external resource topic set and a set of topics associated with the segment; and
   provide to the user, the member of the candidate external resources.

8. A system, comprising:
   a passage processing logic to identify topics with which a passage is related and to associate each of the topics with a set of keywords;
   a passage segmentation logic to classify segments of the passage into the topics based on keywords within the segments;
   a segment processing logic to generate a question from a segment based on keywords within the segment and on linguistic patterns within the segment;
   a candidate resource retrieval logic to retrieve candidate external resources associated with the question;
   a recommendation logic to provide a candidate external resource, where the candidate external resource is selected based on a topic with which the question is associated; and
   an interface to generate a first window comprising a content area to display a document and receive a selection of the passage in the document and to display a second window to select the question associated with the passage and display the candidate external resource;
   wherein the processing logics, the segmentation logic, the retrieval logic, and the recommendation logic are implemented by two or more processors.

9. The system of claim 8, comprising a data store to store a set of resources, where the candidate resource retrieval logic retrieves the candidate external resources from the data store.

10. The system of claim 8, where the segment processing logic applies a set of templates to the keywords within the segment and to the linguistic patterns within the segment to generate the question.

11. A method, comprising:
extract topics discussed in the document from the document, where the topics are defined by words associated with the respective topics within the document;
associating segments from the document with the topics based on words in the segments and by the words associated with the respective topics;
generating questions from the segments by matching segment structures to linguistic patterns associated with question templates;
obtaining a set of external answering resources for the questions;
ranking members of the set of external answering resources for questions according to topics identified in the respective members of the set of external answering resources and topics to which the questions are related;
receiving a selection of the segment of the document in a first window of the user interface, wherein the first window comprises a content area;
selecting a question associated with the segment of the document that is selected in the content area, wherein the question is selected from a second window of the user interface; and
providing members of the set of external answering resources in the second window of the user interface to a user in response to the question that is selected based on rankings of the external answering resources for the question.

12. The method of claim 11, where associating the segments with the topics comprises:
converting the segments to segment vectors;
converting the topics to topic vectors; and
associating segments with a topic based on distances between segments vectors and topic vectors.

13. The method of claim 11, where ranking members of the set of external answering resources comprises:
converting the members of the set of external answering resources to resource vectors;
converting the questions to question vectors based on the segments with which the questions are related to; and
ranking the members of the set of external answering resources for questions based on distances between the resource vectors and the question vectors.

* * * * *